US009195578B2

(12) United States Patent
Fang et al.

(10) Patent No.: US 9,195,578 B2
(45) Date of Patent: Nov. 24, 2015

(54) SYSTEMS, METHODS AND COMPUTER PROGRAM PRODUCTS MEMORY SPACE MANAGEMENT FOR STORAGE CLASS MEMORY

(75) Inventors: Ru Fang, Beijing (CN); Bin He, San Jose, CA (US); Hui-I Hsiao, Saratoga, CA (US); Chandrasekaran Mohan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/594,098

(22) Filed: Aug. 24, 2012

(65) Prior Publication Data

US 2014/0059284 A1 Feb. 27, 2014

(51) Int. Cl.
*G06F 12/00* (2006.01)
*G06F 12/02* (2006.01)

(52) U.S. Cl.
CPC ..................... *G06F 12/02* (2013.01)

(58) Field of Classification Search
CPC ...................................... G06F 12/02
USPC ........................................... 711/104
See application file for complete search history.

(56) References Cited

U.S. PATENT DOCUMENTS

| 5,630,093 | A | * | 5/1997 | Holzhammer et al. | ....... 711/115 |
| 5,867,641 | A | * | 2/1999 | Jenett | ........................... 714/6.32 |
| 5,930,827 | A | | 7/1999 | Sturges | |
| 6,247,105 | B1 | | 6/2001 | Goldstein et al. | |
| 6,249,852 | B1 | | 6/2001 | Benayon et al. | |
| 6,412,053 | B2 | | 6/2002 | Bonola | |
| 6,928,521 | B1 | * | 8/2005 | Burton et al. | .................. 711/144 |
| 7,610,468 | B2 | | 10/2009 | Madisetti | |
| 8,407,377 | B1 | * | 3/2013 | Shapiro et al. | ................... 710/23 |
| 8,874,850 | B1 | * | 10/2014 | Goodson et al. | .............. 711/133 |
| 2005/0060509 | A1 | | 3/2005 | Loafman | |
| 2009/0150599 | A1 | * | 6/2009 | Bennett | ......................... 711/103 |
| 2010/0122200 | A1 | * | 5/2010 | Merry et al. | .................. 715/771 |
| 2011/0055458 | A1 | * | 3/2011 | Kuehne | .......................... 711/103 |

(Continued)

FOREIGN PATENT DOCUMENTS

| JP | 411088357 A | 3/1999 | |
| JP | 2010092113 A | 4/2010 | |
| WO | WO2013101158 | * 7/2013 | ......... G11C 13/0004 |

OTHER PUBLICATIONS

Burr, G.W. et al., "Overview of Candidate Device Technologies for Storage-Class Memory", International Business Machines Corporation Journal Research & Development, Jul./Sep. 2008, pp. 449-464, vol. 52, No. 4/5, IBM, United States.

(Continued)

*Primary Examiner* — Charles Rones
*Assistant Examiner* — Nanci Wong
(74) *Attorney, Agent, or Firm* — Sherman IP LLP; Kenneth L. Sherman; Hemavathy Perumal

(57) ABSTRACT

Embodiments of the present invention provide a system, method and computer program products for memory space management for storage class memory. One embodiment comprises a method for information storage in an information technology environment. The method comprises storing data in a storage class memory (SCM) space, and storing storage management metadata corresponding to said data, in the SCM in a first data structure. The method further includes buffering storage management metadata corresponding to said data, in a main memory in a second data structure.

17 Claims, 14 Drawing Sheets

(56) References Cited

U.S. PATENT DOCUMENTS

| | | | |
|---|---|---|---|
| 2011/0060887 A1 | 3/2011 | Thatcher et al. | |
| 2011/0131472 A1 | 6/2011 | Antonakopoulos et al. | |
| 2012/0131261 A1* | 5/2012 | Ferrari et al. | 711/103 |
| 2012/0131285 A1* | 5/2012 | Leshchiner et al. | 711/147 |
| 2012/0151130 A1* | 6/2012 | Merry et al. | 711/103 |
| 2012/0246388 A1* | 9/2012 | Hashimoto | 711/103 |
| 2013/0151759 A1* | 6/2013 | Shim et al. | 711/103 |

OTHER PUBLICATIONS

Lam, C.H., "Storage Class Memory", Proceedings of the 2010 10th IEEE International Conference on Solid-State and Integrated Circuit Technology (ICSICT), Nov. 1-4, 2010, pp. 1080-1083, IEEE, United States.

Freitas, R.F. et al, "Storage-Class Memory: The Next Storage System Technology", International Business Machines Corporation Journal Research & Development, Jul./Sep. 2008, pp. 439-447, vol. 52, No. 4/5, IBM, United States.

Lee, B.C. et al., "Architecting Phase Change Memory as a Scalable DRAM Alternative", Proceedings of the 36th Annual International Symposium on Computer Architecture, Jun. 20-24, 2009, pp. 2-13, ACM, United States.

* cited by examiner

SYSTEMS, METHODS AND COMPUTER PROGRAM PRODUCTS MEMORY SPACE MANAGEMENT FOR STORAGE CLASS MEMORY

BACKGROUND

1. Field of the Invention

The present invention relates generally to data storage management, and more particularly to data storage space management for storage class memory.

2. Description of Related Art

Many software systems, such as database software systems (data stores), in information technology system rely on hard disk drive (HDD) storage for persistency of stored data. However, because of the slow HDD input/output (I/O) performance in both latency and bandwidth, writing to a HDD has long been a key bottleneck of software systems. Due to a large difference in access speed between Dynamic Random Access Memory (DRAM) and HDD, "hiding" I/O during application execution has become important in software system design. However, attempting to reduce or hide I/O performance impact makes data software systems design and application building complex.

In conventional space management approaches for HDD space management, the entire space is divided into fixed-size pages due to the physical features of HDD. One page may have several HDD blocks. Reading and writing of data must comply with page format, wherein even for reading or writing a single bit of data, an entire page is read out of, or written into, an HDD. Further, all data to be written to HDD is formatted into a page schema.

In conventional space management approaches for DRAM space management, the Buddy System is most commonly used for main memory space management. In Buddy System, a complex space management data structure is introduced to avoid page limitation and fragmentation, and also to provide more flexible space allocation. However, such space management data structure must be modified frequently.

BRIEF SUMMARY

Embodiments of the present invention provide a system, method and computer program products for memory space management for storage class memory. One embodiment comprises a method for information storage in an information technology environment. The method comprises storing data in a storage class memory (SCM) space, and storing storage management metadata corresponding to said data, in the SCM in a first data structure. The method further includes buffering storage management metadata corresponding to said data, in a main memory in a second data structure.

In one embodiment the main memory comprises random access memory. In one embodiment the SCM space comprises a SCM header area and a SCM data area, wherein the SCM data area is for storing said data, and the SCM header area is for storing said storage management metadata.

In one embodiment, the SCM data area comprises fixed-size data pages, and each data page includes fixed-size slots. The slots in different pages may have different sizes. The storage management metadata comprises a page map that indicates if a data page is occupied, and a slot map data that indicates if a slot in a data page is occupied.

In one embodiment the method further includes maintaining storage management metadata comprising at least a slab class data structure that includes a list of data page identifiers or page addresses in the SCM data area with slots of the same size (i.e., free page list), and a list of same-size free slot identifiers or slot addresses in the SCM data area, of which the corresponding slots are released by a user or an application (i.e., free slot list).

In one embodiment, in response to a storage space allocation request, the free slot list of a slab class is searched in the main memory for a free slot. If a free slot is not found, allocating a slot in a data page in the SCM data area. The identifier or address of this data page is the last one in the free page list of the same slab class.

In one embodiment, in response to a data item read request, a slot in a data page containing said data item is directly read from the SCM data area, without reading the entire data page from the SCM data area. In response to a data item write request, a slot in the SCM data area is located via the storage space allocation request. Corresponding metadata in the main memory is updated. The data item is written to the located slot in the SCM data area. The corresponding metadata in the SCM header area is selectively updated, such as when needed.

These and other aspects, features and advantages of the invention will be understood with reference to the drawing figure, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
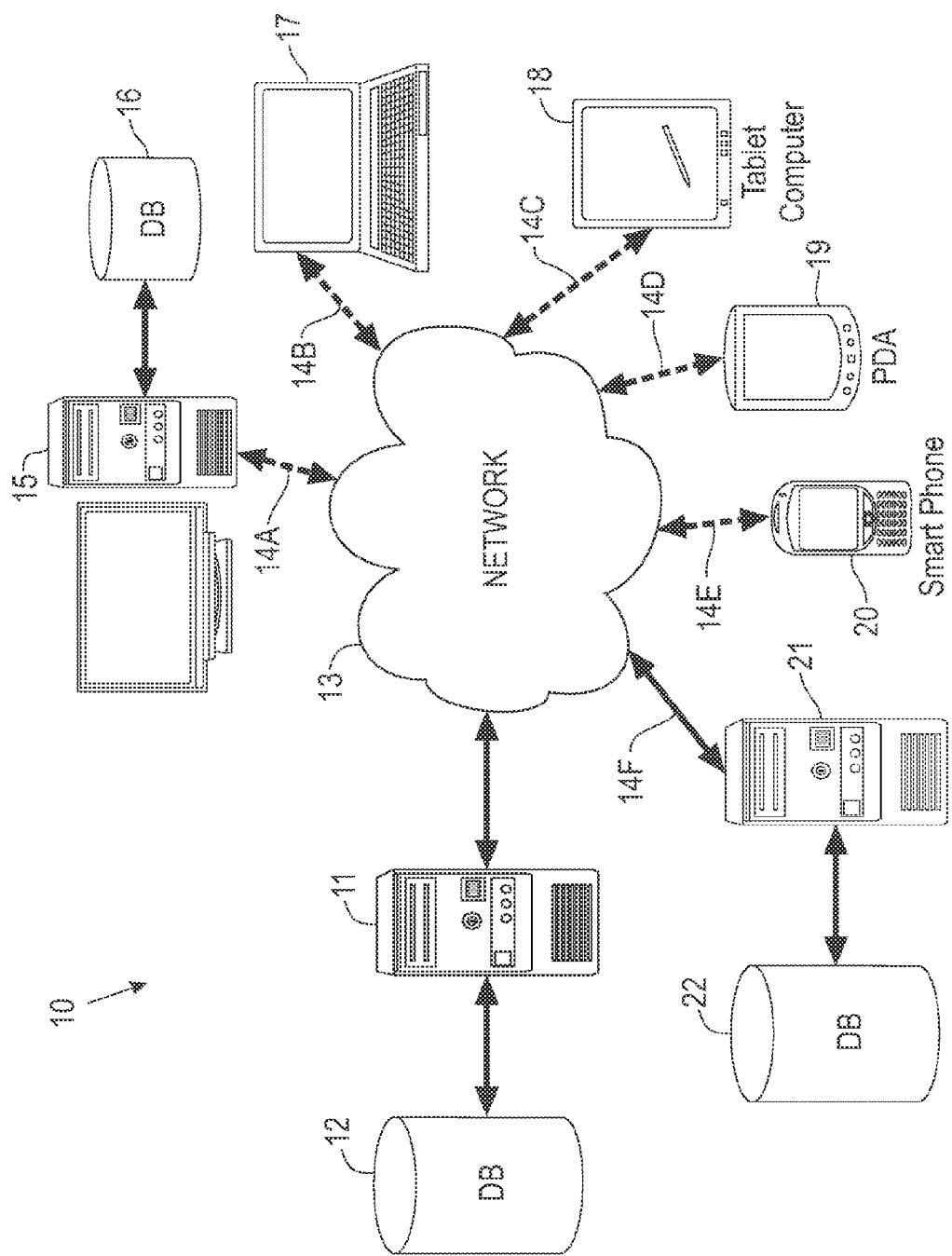
FIG. 1 is a block diagram illustrating an example information technology system for storing data in a storage space including SCM space, utilizing a storage space management process, according to an embodiment of the present invention.

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

Embodiments of the present invention relate to a data storage space management system for a storage class memory (SCM) storage device. Storage class memory is a class of memory technology that can be accessed like DRAM and is nonvolatile like HDD. As such, SCM technology allows persistency for data in software systems, directed to overcoming major I/O bottlenecks, thereby enabling design of more effective and streamlined software systems. SCM is byte-addressable and a common example of SCM is Phase Changed Memory (PCM).

Embodiments of the invention provide data storage space management ("space management") systems, methods and computer program products for SCM storage space management. A space management system according to an embodiment of the invention relates to improving the performance of a software system that utilizes SCM for information storage.

In one embodiment of the invention, data is only stored in the SCM (no data is stored in DRAM). The space management metadata is stored in the SCM and also buffered in DRAM. However, the data structures of the space management metadata are different in SCM and DRAM.

In one embodiment of the invention, the SCM space is divided into partitions comprising a space header area (i.e., SCM header area) and a data area (i.e., SCM data area). The SCM header area includes all the space management metadata and the real (actual) data is stored in the data area (i.e., SCM data area). The SCM data area is divided into partitions including fixed-size pages, wherein the size of the pages can be configured, such as by a user or application. Inside a data page in the SCM data area, the data page space is also divided into partitions comprising fixed-size slots. In different pages, the sizes of slots may be different. A page map data structure is maintained in the SCM header area to indicate if a page is occupied or not. A slot map data structure is maintained in the SCM header area to indicate if a slot is occupied or not.

In one embodiment of the invention, for DRAM space management, at least one data structure (e.g., slab class) is utilized to improve storage space allocation performance. Each slab class maintains a list of said page identifiers or addresses in said SCM data area of which the corresponding pages have slots of the same size (i.e. free page list), and a list of free slot identifiers or page addresses (i.e. free slot list), of which the corresponding slots are released (e.g., by a user or application).

According to an embodiment of the space management system disclosed herein, when a space allocation request is received, a process of the space management system first searches in said free slots list in a slab class in DRAM according to the request size. If no free slot is found, the process proceeds to the end of the last page in a free page list of a slab class and allocates one slot therein. If there is no free space in the last page, the process allocates a free page from the SCM data area, adds the identifier or address of this page to the end of the free page list of the slab class, and allocates a slot from this page.

In one embodiment of the invention, when reading an item from storage, the specific slot containing the item is read directly from the SCM data area, without reading the whole page containing said specific slot out of the SCM data area.

In one embodiment of the invention, when writing an item to storage, a process of the space management system first changes the metadata in DRAM and allocates a slot in the SCM data area. Then the item is written directly to the allocated slot in the SCM data area. Corresponding metadata changes are updated in the SCM header area only when needed. For example, a database process may allocate a slot in the SCM data area and write a data item into the allocated slot during transaction processing, and then update the corresponding metadata in the SCM space area when the transaction commits.

Referring now to the drawings, in which like numerals illustrate like elements throughout the several views, FIG. 1 illustrates an example of the basic components of an information technology system 10 utilizing a data storage space management process for SCM devices, used in connection with a preferred embodiment of the present invention. The system 10 includes a server 11 and the remote devices 15 and 17-20 that utilize a space management system 100 (FIG. 2) implementing a data storage space management process for SCM devices, according to an embodiment of the present invention.

Each of the remote devices 15 and 17-20 has applications and can have a local database 16. Server 11 contains applications, and a database 12 that can be accessed by remote device 15 and 17-20 via connections 14(A-F), respectively, over network 13. In one implementation, the server 11 executes software for a computer network and controls access to itself and database 12.

The remote device 15 and 17-20 may access the database 12 over a network 13, such as but not limited to: the Internet, a local area network (LAN), a wide area network (WAN), via a telephone line using a modem (POTS), Bluetooth, WiFi, WiMAX, cellular, optical, satellite, radio frequency (RF), Ethernet, magnetic induction, coax, RS-485, the like or other like networks. The server 11 may also be connected to the LAN within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices and the like. When a user at one of the remote devices 15 and 17-20 desires to access data from the database 12 at the server 11, the remote device 15 and 17-20 communicates over the network 13, to access the server 11 and database 12.

Figure 2:
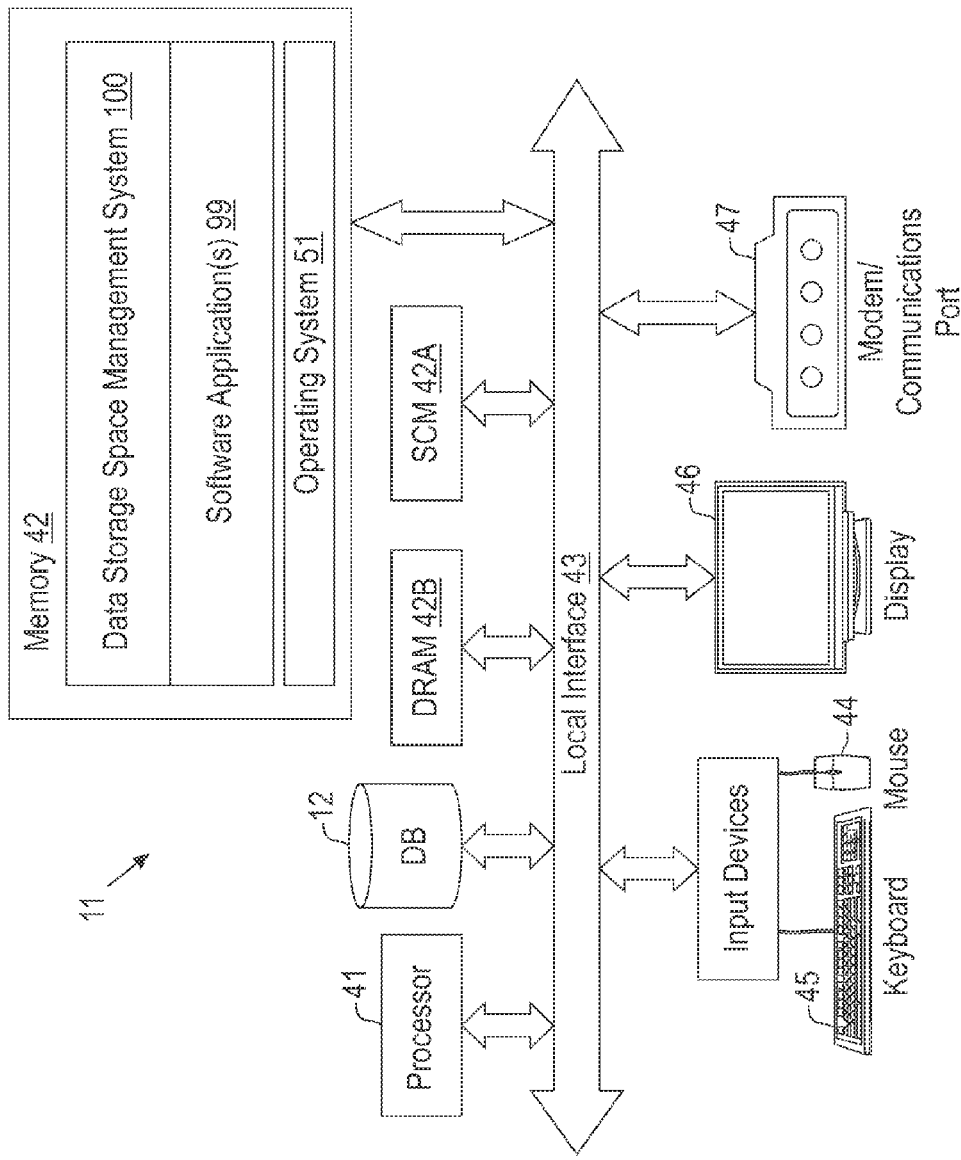
FIG. 2 is a block diagram illustrating an example of a computing system utilizing a storage space management system for data storage in SCM space, according to an embodiment of the present invention.

Third party computer systems 21 and databases 22 can be accessed by space management system 100 on server 11 (FIG. 2). The space management system 100 utilizes a data storage space management process for SCM devices, according to an embodiment of the invention. Data that is obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Illustrated in FIG. 2 is a block diagram demonstrating an example of server 11, as shown in FIG. 1, utilizing the space management system 100 according to an embodiment of the present invention. The server 11 includes, but is not limited to, PCs, workstations, laptops, PDAs, palm devices and the like. The processing components of the third party computer systems are similar to that of the description for the server 11 (FIG. 2). In another embodiment, the space management system 100 may be implemented in the server 11. In another embodiment, the space management system 100 may be implemented in the computer system 21.

Generally, in terms of hardware architecture, as shown in FIG. 2, the server 11 includes a processor 41, a computer readable medium such as memory 42, SCM 42A, DRAM 42B, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the space management system 100 of the present invention. The space management system 100 comprises functional components and process blocks described further below.

The operating system 51 essentially controls the execution of other computer programs, such as the space management system 100, and provides scheduling, input/output control, file and data management, memory management, and communication control and related services. However, the space management system 100 of the present invention is applicable on other operating systems.

The space management system 100 may comprise a source program, executable program (object code), script, or any other entity comprising a set of computer program instructions to be performed. When the space management system 100 is a source program, then the program is usually translated via a compiler, assembler, interpreter, or the like, which may or may not be included within the memory 42, so as to operate properly in connection with the O/S 51. Furthermore, the space management system 100 can be written as (a) an object oriented programming language, which has classes of data and methods, or (b) a procedure programming language, which has routines, subroutines, and/or functions. The computer program instructions may execute entirely on server 11, partly on server 11, as a stand-alone software package, partly on server 11 and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The space management system 100 and the O/S 51 are read, in whole or in part, by the processor 41, perhaps buffered within the processor 41, and then executed.

When the space management system 100 is implemented in software, as is shown in FIG. 2, it should be noted that the space management system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electro-magnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the space management system 100 is implemented in hardware, the space management system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the space management system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote device 15 and 17-20 are similar to the description of the components for server 11 described with regard to FIG. 2. Hereinafter, the remote devices 15 and 17-20 will be referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Exemplary embodiments of the space management system 100 according to the present invention are described hereinbelow in relation to the example system 11 (FIG. 2). Embodiments of the space management system 100 provide fast space allocation. Space management metadata is buffered in DRAM in a different format with that in SCM. During space allocation, the slab class data structure in DRAM is helped to quickly find a free slot in the SCM space. Then, data can be written directly to the slot in the SCM data area.

Embodiments of the space management system 100 avoid external fragmentation. The data area in the SCM space is organized as fixed-size pages and each page contains a group of fixed-size slabs. During an allocation process, the slot which is just fitted in the request size is returned. As such, not only external fragmentation can be avoided, but also complex fragmentation management data structures can be avoided as well.

Embodiments of the space management system 100 avoid unnecessary writing of metadata and protect the lifetime of SCM. To avoid erase-before-write limitation and protect the lifetime of SCM, the frequent writing to the same SCM space area is avoided. In one example, the space management metadata comprises the data which is changed the most frequently. The metadata is cached in a DRAM buffer and only updated to the SCM space when it is absolutely necessary, such as due to transaction commits.

Embodiments of the space management system 100 provide fast recovery from system faults. Because unnecessary data changes are avoided during the writing to SCM space, the recovery process can be simplified and improved. For example, the space management metadata is only updated after the data is written to SCM data area. Then, in case of a system crash during the data writing process, there is no need to recover the space management metadata and the unfinished data when the system restarted, because the change of the space management metadata is not written to SCM, and the unfinished data is not recognized. Thus, system downtime is reduced.

Referring to FIG. 2, in one implementation, the O/S 51 of the system 11 provides at least the following functions for software applications such as application(s) 99:
  A space allocation interface for a software application to allocate space from SCM devices, such as SCM device 42A;
  Ability for an application to find the SCM space allocated before an O/S restart; and
  Guaranteeing the pointers saved in SCM space are not corrupted when O/S restarts, wherein the O/S provides address translation. Upon restart, the O/S can map the SCM space to the same start virtual address.

According to embodiments of the invention, the below system calls are utilized following an inter-process-communication (IPC) share memory calls structure:
  int shpm_get (key_t key, size_t size, int shpmflg)
    Create or lookup a share memory segment. Return an identifier for the share memory segment (shpmid below). If key is null, then generate a key automatically (the key is same to shpmid).
  void*shpm_at (int shpmid, void*shpmaddr, int shpmflg)
    Attach the persistent memory segment identified by shpmid to the address space of the calling process.
  int shpm_dt(const void*shpmaddr)
    Detach the persistent memory segment located at the address specified by shpmaddr from the address space of the calling process.
  int shpm_ctl(int shpmid, int pm_cmd, struct shpmid_ds*buf)
    Control the persistent memory segment. When cmd is PM_RMID, mark the segment to be destroyed. The segment will only actually be destroyed after the last process detaches it. When cmd is PM_STAT, system will return the status information about this segment.

Figure 3:
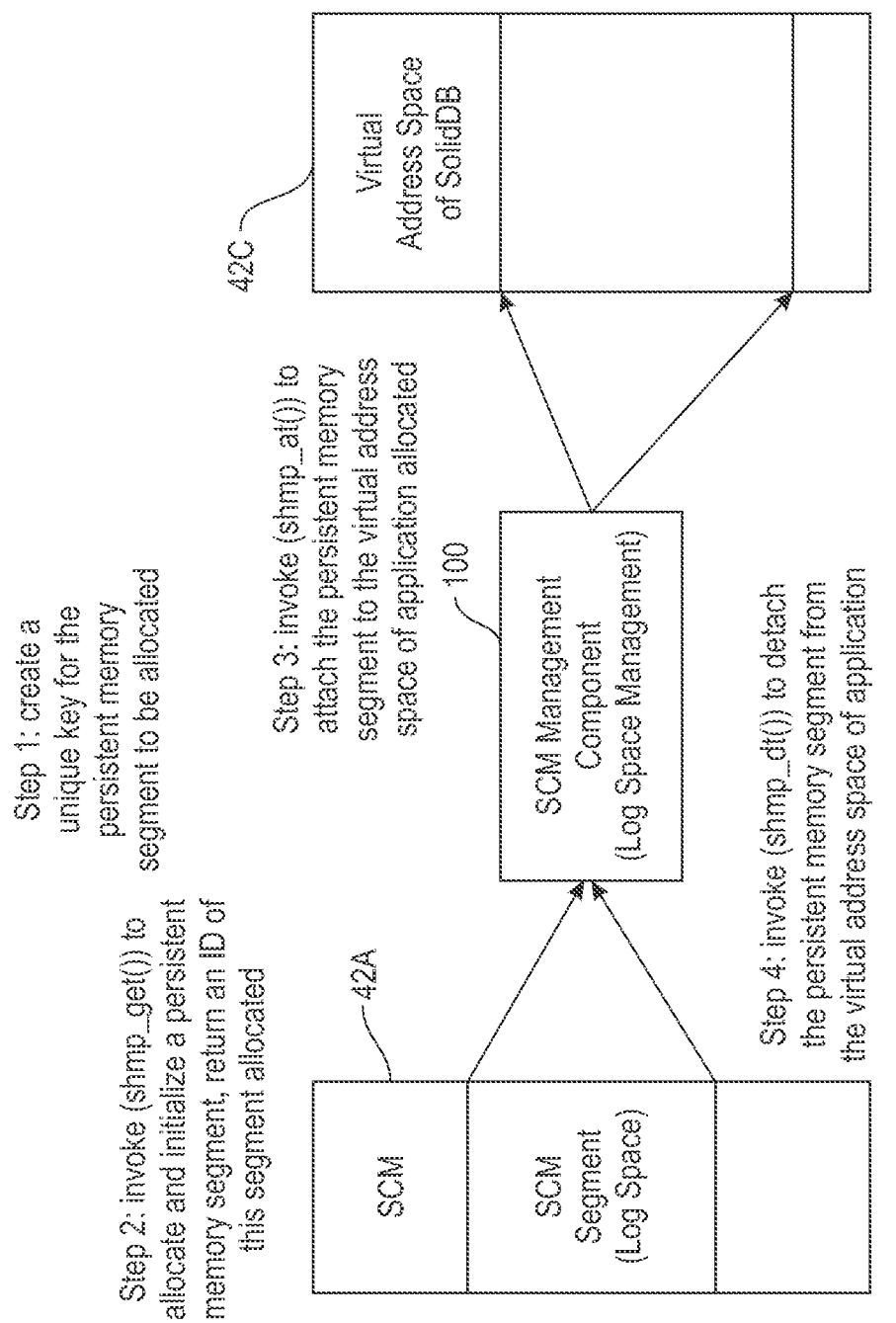
FIG. 3 is a block diagram illustrating an example operation of a storage management system in an operating system for data storage in SCM space, according to an embodiment of the present invention.

FIG. 3 shows an example process using the above system calls in an operating system SCM memory management component of the system 100 for a SCM 42A, according to an embodiment of the invention. The process includes the following steps:
  Create a unique key for a persistent memory segment (i.e., SCM segment in SCM 42A) to be allocated;
  Invoke (shmp_get( )) to allocate and initialize the persistent memory segment, return an ID of this segment allocated;
  Invoke (shmp_at( )) to attach the persistent memory segment to a virtual address space 42C of an application allocated;
  Invoke (shmp_dt( )) to detach the persistent memory segment from said virtual address space of application; and
  Invoke (shmp_ctl( )) with a command (e.g., PM_RMID) to remove the persistent memory segment.

Further, the information technology system (e.g., FIG. 2) provides a memory flush policy functionality for cache line which is write-back. As such, all the data in cache line can be flushed to the SCM 42A when the power is off or system crashes (e.g., battery backup allows such functionality).

Further, said information technology system provides functionality to guarantee a write sequence to SCM, such as memory barrier technology. According to embodiments of the invention, a memory barrier is utilized before a transaction commits, to guarantee all the modified data records have already been written to SCM 42A.

Further, the information technology system provides wear leveling for SCM such as PCM. PCM, as in Flash memory, includes blocks wherein a block can withstand a limited number of write cycles. In order to prolong usable life of PCM, wear leveling is used to ensure that all blocks of PCM are written approximately at the same time. In one embodiment, a software driver module exposes a virtual PCM address, performs virtual-to-physical block translation, and implements wear leveling. In another embodiment, said software driver module is embedded within a PCM hardware controller.

According to embodiments of the invention, all the application data and space management metadata are stored in SCM. The space management metadata is also buffered in DRAM. However, the space management metadata has a different data structure than that in SCM.

Figure 4:
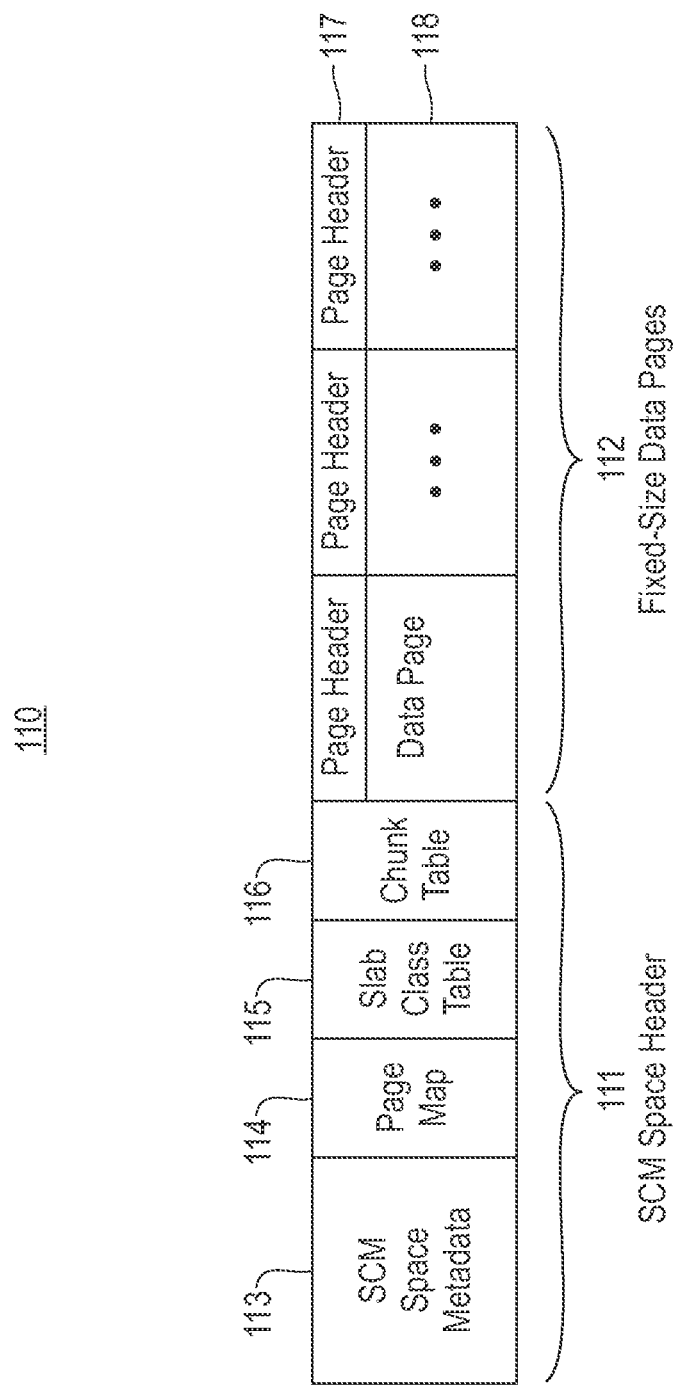
FIG. 4 shows a data structure format for storing data in SCM space, according to an embodiment of the invention.

FIG. 4 shows a data structure format 110 in SCM space, according to an embodiment of the invention. The data structure includes SCM space header 111 in header area, and fixed-size data pages 112 in data area. The SCM space header 111 is used to store SCM space metadata and allocation information, corresponding to the page 112. The SCM space header 111 includes four areas: SCM Space Metadata 113, Page Map 114, Slab Class Table 115 and Chunk Table 116.

In one embodiment, SCM Space Metadata 113 comprises basic information of the SCM space, including:
  SCM size: the size of the entire SCM space;
  SCM key: the unique identifier of SCM space;
  SCM start address: the virtual start address of SCM space;
  SCM space status: the status of SCM space, such as five example status codes defined for a SCM space as:
    001: start to create SCM Space Metadata;
    010: start to set up page map;
    011: start to set up Slab class table;
    100: SCM space is ready for use;
    101: SCM space normal shutdown;
  SCM space metadata size: the size of SCM Space Metadata;
  Page map start address: the virtual start address of page map;
  Page map size: the size of page map;
  Slab class table start address: the virtual start address of slab class table;
  Slab class table size: the size of slab class table;
  Chunk table start address: the virtual start address of chunk table; and
  Chunk table size: the size of chunk table.

In one embodiment, Page Map 114 comprises occupation information of each page, including:

Every entry in a page map has 1 bit to indicate if the corresponding page is used or not. Every page has a unique page ID (PID). From the page ID the start address of the corresponding page can be calculated.

In one embodiment, Slab Class Table 115 includes information of each slab class, including:

A slab class describes a set of pages, in which all the sizes of slabs are the same. Every entry in the Slab Class Table (SCT) describes the metadata of a slab class, including:

Slab class ID: the unique identifier of this slab class. Now slab class ID is a 64-bit integer, and it is the power of the factor, according to the slab size in this slab class;

Slab size: the slab size of this slab class;

Page list header: the ID of the first page in this slab class;

Temp page list header: the ID of the page which will be add to the page list; and Slab class status: the status of a slab class. Currently there are three status codes defined for a SCM space:
000: ready for use;
001: start to add a page;
010: finish adding a page.

In most common cases, the size of a slab is smaller than a page. Every slab has a unique ID. The Slab ID comprises slab class ID, page ID and slot ID inside a page. With this ID, the address of this slab can be easily calculated. If the size of a slab is larger than a page, the Slab ID is the chunk ID. The first 5 bits are 00000. The address of this slab can be calculated from the chunk table. The allocation of this type of slab is actually to allocate a chunk.

In one embodiment, chunk Table 116 comprises information of each chunk. The size of a chunk is larger than that of a page. In one embodiment, a chunk comprises as a group of continuous pages. A special chunk table is used to manage the chunks. An entry in the chunk table describes the metadata of a chunk, including:

Chunk ID: the unique identifier for a chunk. In the implementation, it is a 64-bit integer with first 5 bit as 0000;

Chunk size: the data size stored in a chunk;

First page ID: the ID of the first page used by this chunk;

The number of pages;

Chunk status: the status of a chunk, such as six example status codes defined for a SCM space as:
001: start initialization;
010: temporarily finish initialization;
011: finish allocation;
100: start deleting pages;
101: finish deleting pages;
110: chunk deleted.

Every chunk has a unique chunk ID. From the chunk table, the start address of this chunk can be calculated from page list.

Figure 5:
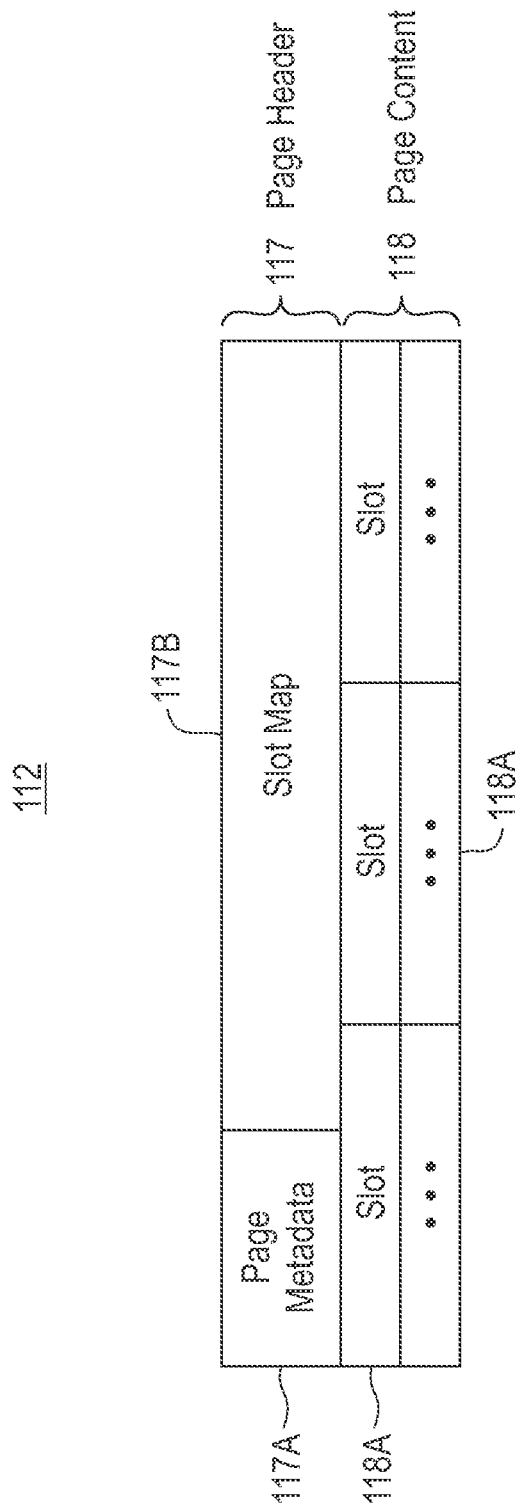
FIG. 5 shows further details of the data structure of FIG. 4, according to an embodiment of the invention.

As shown in FIG. 4, each page 112 includes a page header space 117 and real data page content space 118. FIG. 5 shows a more detailed structure for an SCM Page 112, according to an embodiment of the invention. The page content 118 is organized as a set of fixed-size slots 118A. Within the same page 112, all the slots 118A have the same size. A page header 117 comprises two fields: page metadata 117A and slot map 117B.

The page metadata 117A describes the metadata of the page 112, wherein in one embodiment the page metadata 117A includes:

Page header size: the size of the page header;

Slab size: the size of the slab in this page, wherein if the slab size is larger than one page, then this field indicates "L";

Next page ID: the unique identifier of the next page in the same slab class. If this page belongs to a chunk, then this field is 0;

Page status: the status of this page, such as four example status codes defined as:
001: start initialization;
010: finish initialization;
011: start deleting;
100: finish deleting.

Each entry (1 bit) in the slot map 117B indicates if a corresponding slot 118A in the page content 118 is occupied or not (e.g., 0 or 1). If the slab size is larger than a page 112, then there is no slot map 117B in the page header 117.

Figure 6:
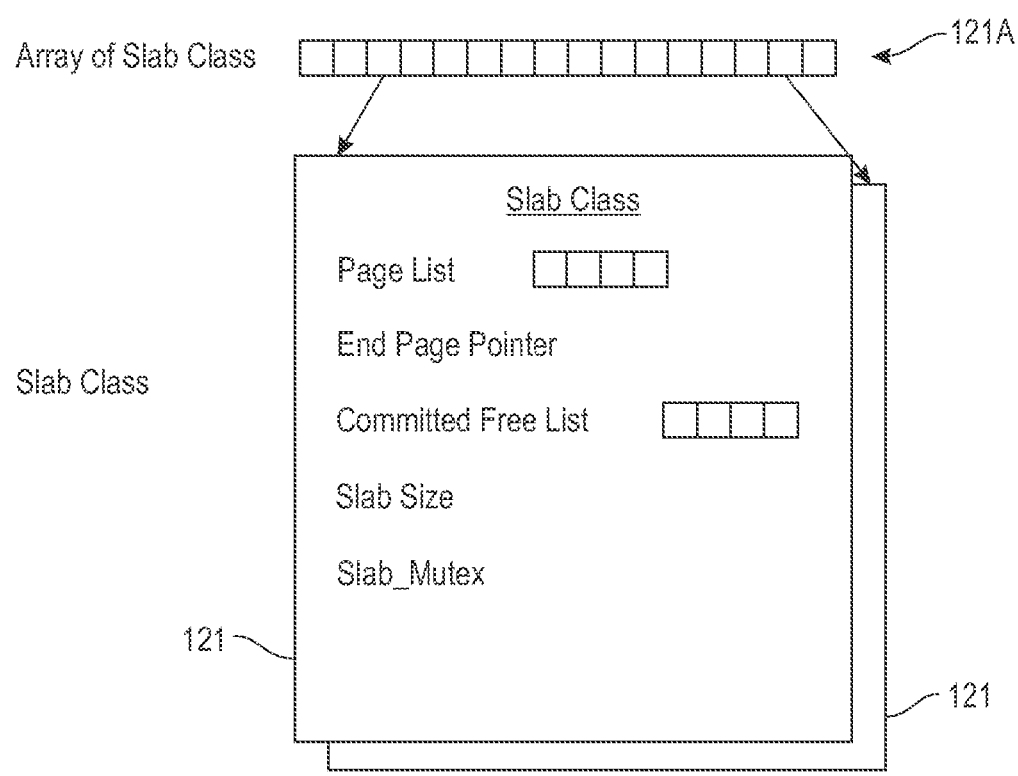
FIG. 6 shows a data structure format for storing storage management metadata in DRAM, according to an embodiment of the invention.
Figure 6:
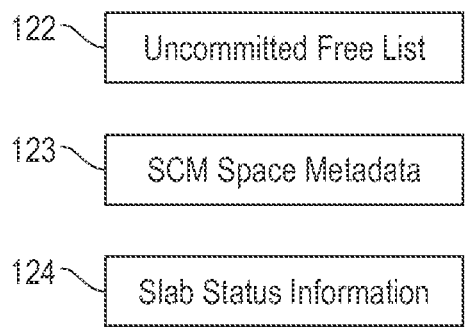

The metadata and allocation information for SCM space are also buffered in DRAM buffer, but in a different format than in SCM. As shown in FIG. 6, a data structure format 120 in DRAM includes four parts: Slab Class Management Metadata 121, Uncommitted Free List 122, SCM Space Metadata 123, and Slab Status Information 124, according to an embodiment of the invention.

In one embodiment, an array 121A is maintained in DRAM buffer to store the information of the slab classes 121. Each entry 121 in the array 121A describes the metadata information of a slab class, including:

Page List: the pages allocated to this slab class;

End Page Pointer: the ID of the first free slab at the last page;

Committed Free List: the IDs of slabs which have been released by the user;

Slab Size: the size of the slab in this slab class;

Slab Mutex: the lock information of this slab class.

The Uncommitted Free List 122 maintains a list of slab IDs of which the slabs are freed by the user. However, the space management metadata is only changed in DRAM buffer, and not updated to SCM space yet. When a slab is actually freed from SCM space (the space management metadata is updated to SCM), it is removed from the Uncommitted Free List 122.

The SCM Space Metadata data 123 generated dynamically, indicating the dynamic status of SCM, including:

SCM size: the size of SCM;

Page size: the size of a SCM page;

Used pages: the number of pages which have been used;

Free pages: the number of free pages;

Total slab classes: the number of slab classes;

Total chunks: the number of allocated chunks.

The Slab Status Information 124 for a slab ID, indicates the dynamic status of the slab, including:

Slab size: the size of the slab;

Slab occupied: the slab is used or not.

Figure 7:
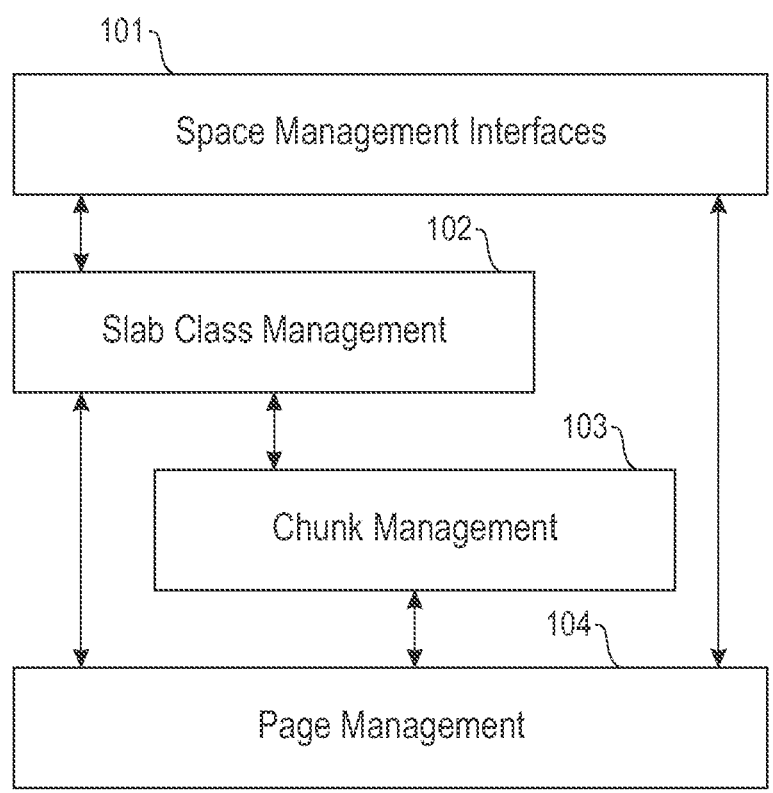
FIG. 7 is a block diagram showing example management modules of a space management system, according to an embodiment of the invention.

FIG. 7 is a block diagram showing example SCM management modules of the space management system 100 (FIG. 2), according to an embodiment of the invention. In said embodiment, the space management system 100 comprises space management interface modules 101, slab class management module 102, chunk management module 103, and page management module 104.

In one embodiment, a space management interface module 101 invokes corresponding interfaces of different modules, and provides the following functional interfaces to the other modules:

scm_init( ): when system starts, allocate and initialize SCM space, establish all the metadata, load necessary metadata to DRAM.

scm_provisional_malloc(size_t nbytes): allocate a slab, only change the space allocation metadata in the DRAM buffer, but do not change the space allocation metadata in SCM.

scm_provisional_free(long slab_ID): free a slab, only change the space allocation metadata in the DRAM buffer, but not change the space allocation metadata in SCM.

spacemap_update(long slab_ID, int occupied): synchronize the space allocation metadata in the DRAM buffer with the space map in SCM (this function is to actually allocate or free a slab or a chunk in SCM).

id_to_address(long slab_ID): given a slab ID or chunk ID, return the virtual start address of this slab.

scm_slab_stats(long slab_ID): return the status information of a specified slab.

scm_stats( ) return the status information of the entire SCM space.

Figure 8:
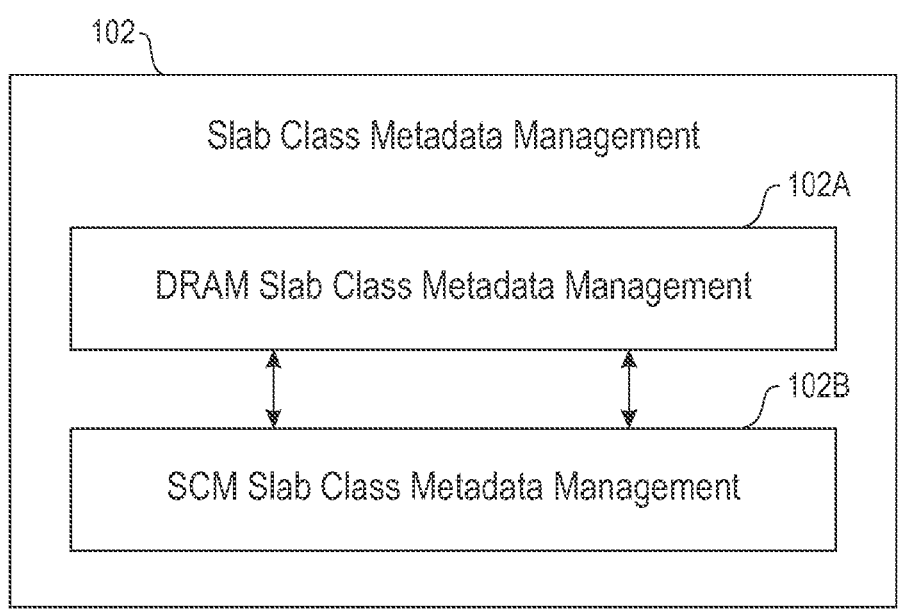
FIG. 8 is a block diagram showing further details of a metadata management module of FIG. 7, according to an embodiment of the invention.

The slab class management module 102 includes a DRAM Slab Class Metadata Management module 102A and SCM Slab Class Metadata Management 102B, shown by example in FIG. 8, according to an embodiment of the invention. The DRAM Slab Class Metadata Management module 102A maintains the slab class metadata in DRAM, and allocates/releases slabs for other components. Because the space allocation metadata is only changed in DRAM buffer, the allocation and release are called "temporary allocation" and "temporary free". Examples of functionalities of the DRAM Slab Class Metadata Management module 102A include:

Temporarily allocate a slab: If the requested DRAM slab size is not larger than one page, allocate a DRAM slab by only changing the slab class data structure in DRAM; otherwise allocate a DRAM chunk by invoking the chunk management module 103 (FIG. 7).

Temporarily free a slab: According to the request slab ID, find the corresponding slab class; if the slab size is not larger than one page, release (free) this slab by only changing the slab class data structure in DRAM (adding the slab add to the free list of the slab class); otherwise invoke chunk management module to free this slab (chunk).

Slab ID to slab class mapping: Given a slab ID, find the corresponding slab class.

Example interfaces provided by the DRAM Slab Class Metadata Management module 102A include:

long slab_temp_allocate(size_t slab_size): Temporarily allocate a slab, return slab ID for success or error code.

int slab_temp_free(long slab_ID): Temporarily free a slab, return 1 for success or error code.

int*slabID_to_slabClass(long slab_ID): mapping from slab ID to slab class ID, return slab class ID or error code.

void*slabID_to_address(long slab ID): according to the request slab ID, calculate its start address.

The SCM Slab Class Management module 102B maintains the slab class table in SCM, and changes the page header to actually allocate/release slabs from SCM. The module 102B only handles slabs with sizes not larger than one page. Examples of functionalities of the SCM Slab Class Management module 102B include:

Allocate a slab: According to request slab ID, actually allocate a SCM slab in the corresponding page (change "0" to "1" in the slot map in the page header).

Free a slab: According to request slab ID, actually free the SCM slab in the corresponding page (change "1" to "0" in the slot map in the page header).

Connect a page to a slab class: According to the request page ID and slab class ID, invoke page management module to allocate this page in SCM and add this page to the page list of the corresponding slab class.

Example interfaces provided by SCM Slab Class Management module 102B include:

int slab_allocate(size_t slab_ID): allocate a slab in a SCM data page, return 1 for success or error code.

int slab_free(long slab_ID): free a slab from a SCM data page, return 1 for success or error code.

int page_connect_slabClass(long slabClass_pagelist header, long page_ID): add this page to a slab class page list, return 1 for success or error code.

The chunk management module 103 maintains the chunk table, and provides chunk management functions, including:

Allocate a chunk: According to the request chunk size, invoke page management module 104 to allocate several pages; create an entry in the chunk table with corresponding metadata.

Free a chunk: According to the request chunk ID, remove the corresponding chunk table entry and also free corresponding pages by invoking page management module 104.

Example interfaces provided by chunk management module include:

long chunk_allocate(size_t chunk_size): allocate a chunk, return the chunk ID allocated.

int chunk_free(long chunkID): free a chunk, return 1 for success or error code.

void*chunkID_to_address(long chunk_ID): according to the request chunk ID, calculate its start address.

Page management module 104 maintains the page map, and provides page management functions, including:

Format space: According to the pre-defined page size in the configuration file, calculate the size of a page map and set up the page map.

Allocate a page: According to the request page ID, allocate and initialize a page. First finds a free page in page map, and change "0" to "1" in the page map entry; initialize the page header and set up the slot map according to request slab size. If the request slab size is larger than one page, then in page header, set the "slab size=L" and there is no slot map.

Free a page: According to the request page ID, free this page (change "1" to "0" in the corresponding entry in the page map), and clear the page header.

Find pages: According the request number of pages, find a group of sequential free pages.

Example interfaces provided by page management module 104 include:

int scm_format(size_t page_size): format space, return 1 for success or error code.

int page_allocate(long page_ID, long slab_size): allocate and initialize one page, return 1 for success or error code.

int page_free(long page_ID): given a page ID, free this page, return 1 for success or error code.

long page_lookup(int number_of_pages): find a group of sequential free pages, return the first page ID or error code.

void*pageID_to_address(long page_ID): according to the request page ID, calculate its start address.

Figure 9:
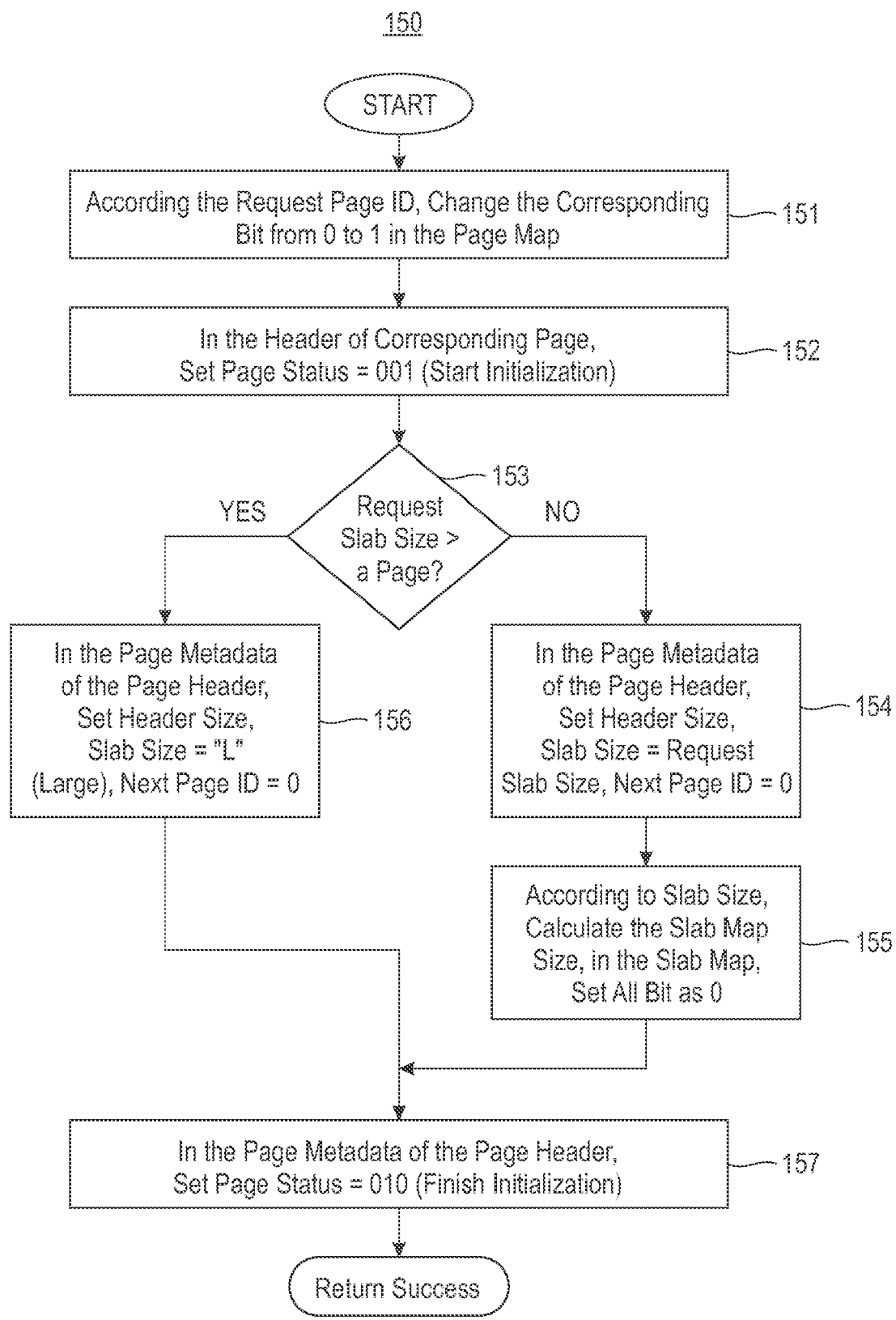
FIG. 9 is a flowchart showing a page application process of the space management system, according to an embodiment of the invention.

FIG. 9 shows a flowchart of an example page allocation process 150 of the space management system 100, according to an embodiment of the invention. In process block 151, according to the request page ID, the corresponding bit is changed from 0 to 1 in the page map. In process block 152, in the header of the corresponding page, page status is set to 001 (start initialization). In process block 153 it is determined if the request slab size is larger than a page. If yes, in process block 156, in the page metadata of the page header, set header size, slab size="L" (large), next page ID=0, then proceed to process block 157. Otherwise, in process block 154, in the page metadata of the page header, set header size, slab size=request slab size, next page ID=0, then proceed to process block 155. In process block 155, according to slab size, calculate the slab map size, in the slab map, set all bits as 0. In process block 157, in the page metadata of the page header, set page status=010 (finish initialization).

Figure 10:
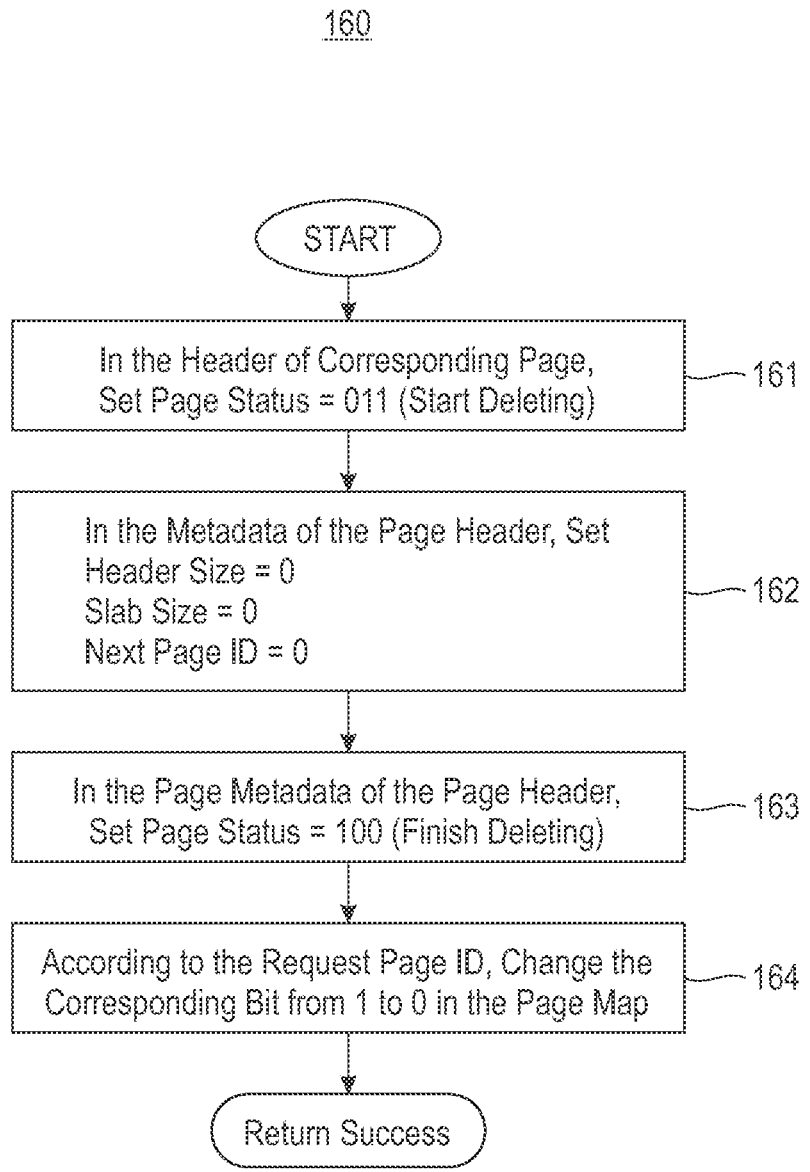
FIG. 10 is a flowchart showing a page release process of the space management system, according to an embodiment of the invention.

FIG. 10 shows a flowchart of an example page release process 160 of the space management system 100, according to an embodiment of the invention. According to the requested page ID, the page metadata is cleared and the page is released from the page map. Specifically, in process block 161, in the header of the corresponding page, the page status is set to 011 (start deleting page). In process block 162, in the page metadata of the page header, the header size is set to 0, slab size is set to 0, next page ID is set to 0. In process block 163, in the page metadata of the page header, the page status is set to 100 (finish deleting page). In process block 164, according to the request page ID, change the corresponding bit in the page map from 1 to 0.

In one embodiment, given a requested page ID and slab class ID, the page is added to the page list of the requested slab class by a process in the space management system 100, including the following steps:
- In the corresponding Slab Class Table entry, set slab class status=001 (start adding a page);
- In the corresponding Slab Class Table entry, set temp page list header=request page ID;
- Invoke page management module, allocate and initialize this page (invoke function page_allocate (long page_ID, long slab_size));
- In the corresponding page header, set next page ID=slab class page list header;
- In the Slab Class Table entry, copy the temp page list header to the page list header; and
- Set slab class status=010 (finish adding a page).

In one embodiment, given a requested chunk size, a chunk allocation function allocates a chunk and returns the chunk ID by a process in the space management system 100, including the following steps:
- According to the request chunk size, calculate the number of pages;
- Scan in the page map, attempt to find a sequence of pages; if cannot find such pages, use return error code;
- Find an empty entry in the Chunk Table, set chunk status=001 (start initialization), chunk ID, chunk size and page list;
- Invoke the page management module to allocate the related pages (invoke page_allocate (long page_ID, long slab_size));
- In the chunk table entry, set chunk status=010 (temporarily finish initialization); and
- Return chunk ID.

The above chuck allocation function is only used during transaction processing.

In one embodiment, given a requested chunk ID, a chunk release function in the space management system 100 includes following steps:
- According to the requested chunk ID, find the entry in the Chunk Table;
- Set chunk status=100 (start deleting pages);
- Invoke the page management module 104 to free the related pages in page list (invoke function page_free (long page_ID));
- Set chunk status=101 (finish deleting pages);
- Remove chunk ID, chunk size;
- Set chunk status=110 (chunk deleted); and
- Remove the page list (set it as null).

In one embodiment, allocation of a slab by the space management system 100 includes two general steps. First a function such as scm_provisional_malloc( ) is invoked to allocate a slab by only changing space management metadata in the DRAM buffer. Second, a function such as spacemap_update( ) is invoked to update space allocation metadata to SCM space. For example, during database transaction processing, a transaction first invokes scm_provisional_malloc( ) to allocate a slab. When the transaction commits, it invokes spacemap_update( ) to update the space management metadata changes to those in the SCM space.

Figure 11:
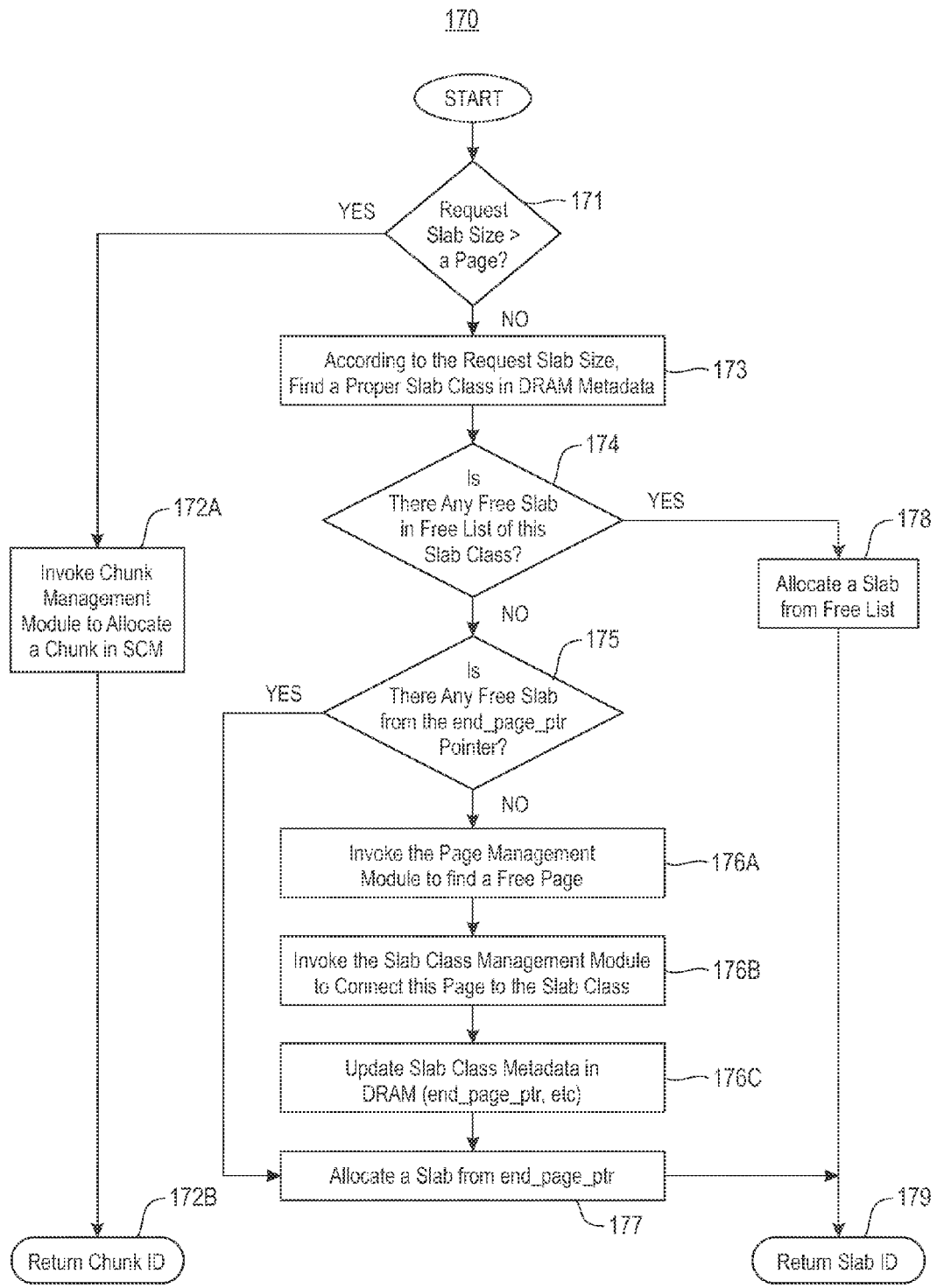
FIG. 11 is a flowchart of a storage slab allocation process of the space management system, according to an embodiment of the invention.

An embodiment of a slab allocation process is described below. FIG. 11 shows a flowchart of an example slab allocation process 170 of the space management system 100, according to an embodiment of the invention. A slab is allocated by only changing the space management metadata in DRAM buffer.

Process block 171 determines if the requested slab size is larger in size than a page. If yes, process block 172A invokes chunk management module 103 to allocate a chunk in SCM, and in process block 172B return the chunk ID. If the requested slab size is larger in size than a page, the process block 173 finds a proper slab class in DRAM metadata based on the requested slab size.

Process block 174 determines if there is any free slab the in free list of the found slab class. If yes, process block 178 allocates a slab from the free list, and process block 179 returns the slab ID.

If there is no free slab the in free list of the found slab class, process block 175 determines if there is any free slab from the end_page_ptr pointer.

If yes, process block 177 allocates a slab from end_page_ptr and proceeds to process block 179. Otherwise, process block 176A invokes the page management module 104 to find a free page. Process block 176B invokes the slab class management module 102 to connect the page to the slab class. Process block 176C updates slab class metadata in DRAM (end_page_ptr, etc.), and proceeds to process block 177.

In one embodiment, a process in the space management system 100 for updating space management metadata comprises:
- According to requested slab ID, find the page with this slab belongs to, and in the header of this page, change the Slab freed from 0 to 1; and
- If this slab ID is a chunk ID, find the corresponding chunk table entry, set the chunk status=011 (finish allocation).

Similar to the slab allocation process, in one embodiment, a slab release process in the space management system 100 comprises a transaction invoking a function such as scm_provisional_free( ), to release a slab by only changing space management metadata in DRAM buffer, then updating the space management metadata changes to those in SCM. A slab is released by only changing space management metadata in DRAM buffer Space and the request slab ID is placed the uncommitted free list. Space management metadata is updated.

Figure 12:
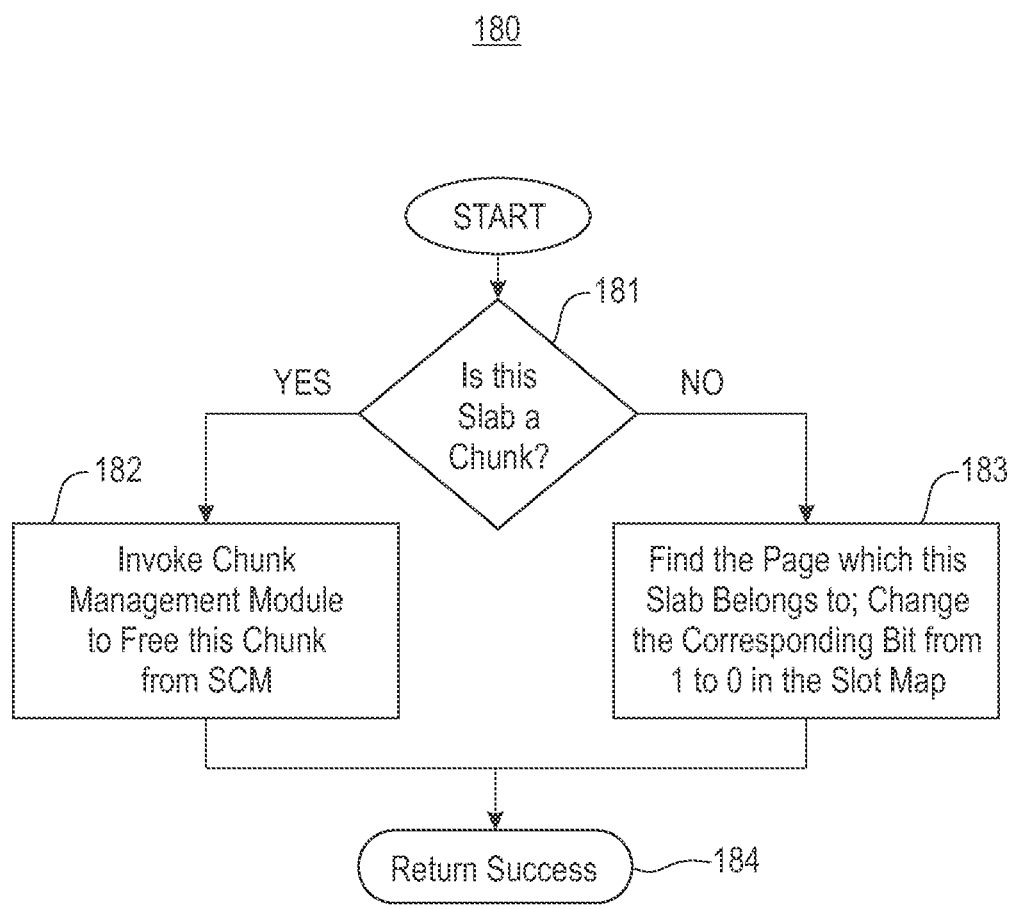
FIG. 12 is a flowchart of a storage slab release process of the space management system, according to an embodiment of the invention.

When the transaction commits, the uncommitted free list is scanned and for every slab ID, a slab release process 180, as shown in FIG. 12, is executed, according to an embodiment of the invention. Process block 181 determines if the slab is a chunk. If yes, process block 182 invokes the chunk management module 103 to free this chunk from SCM. Otherwise, process block 183 finds the page which the slab belongs to, and changes the corresponding bit from 1 to 0 in the slot map. Process block 184 completes the process.

Figure 13:
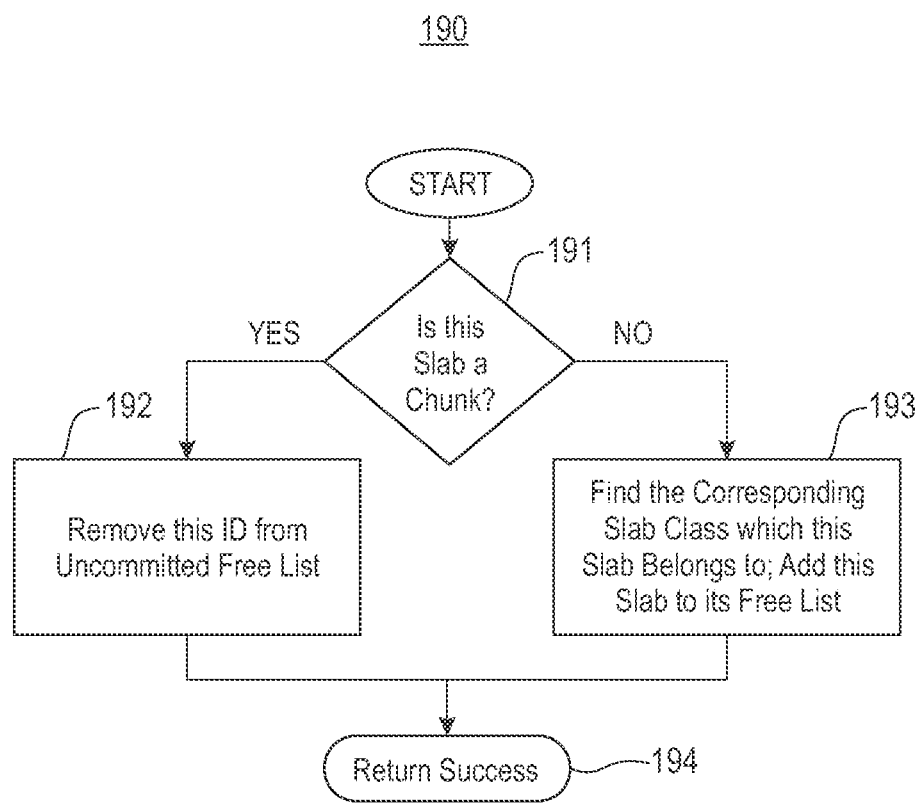
FIG. 13 is a flowchart of further aspects of the storage slab release process of the space management system, according to an embodiment of the invention.

According to a slab release process in the space management system 100, after the transaction commits the uncommitted free list is scanned and the process 190 in FIG. 13 executes. Process block 191 determines if the slab is a chunk. If yes, process block 192 remove the slab ID from the uncommitted free list. Otherwise, process block 193 finds the corresponding slab class which the slab belongs to, and will add the slab add to its free list. Process block 194 completes the process.

In one embodiment, an initialization process reads a configuration file (e.g., Mykonos.ini), and specifies if this is the first-time start. If this is the first-time start, a main process invokes a first time (FT) space initialization process to initialize the storage system. If not, the main process invokes a not-first-time (NFT) space initialization process to find the SCM space from O/S. During space NFT initialization process, the space management system 100 reads the space status, and identifies if the last system shutdown was a normal. If yes, then the NFT initialization continues, otherwise, a space recovery process is started according to an embodiment of the invention.

According to an embodiment of the invention, an FT space initialization process in the space management system 100 comprises:
  Reading parameters including SCM size, SCM write latency, SCM read latency and SCM page size from an initialization file (e.g., Mykonos.ini file);
  According to the pre-defined SCM size, invoking O/S system calls including int shpm_get( ) and shpm_at( ), to allocate a space from SCM device;
  Saving the SCM key and SCM start address returned by shpm_get( ) and shpm_at( ) in the initialization file;
  Reading the SCM metadata size, SCM slab class table size, SCM chunk table size, default smallest slab size and default largest slab size from a configuration file (e.g., mykonos_conf);
  Setting SCM space status=001 (start to create SCM Space metadata);
  Calculating the size of page map, and the start addresses of different data structures in SCM space header, page map, slab class table and chunk table, and writing them into SCM metadata;
  Setting the SCM space status=010 (start to set up page map);
  Setting up SCM page map, and setting all corresponding bits=0;
  Setting the SCM space status=011 (start to set up Slab class table);
  Initializing Slab Class Table (similar to slabs_init( ) in slabs.c in memcached code), including:
    Creating several slab classes wherein the sizes of slabs are from default smallest slab size to default largest slab size;
    For each Slab Class Table entry, setting up the slab class ID, the slab size, and setting:

| Page list header = 0, |
  |---|
  | Temp page list header = 0, |
  | Slab class status = 000; |

Setting SCM space status=100 (SCM space is ready for use); and
  Scanning the Slab Class Table and creating slab classes metadata in DRAM.

According to an embodiment of the invention, an NFT space initialization process in the space management system 100 comprises:
  Reading the parameters including SCM key and SCM start address from a configuration file;
  Invoking O/S system calls, int shpm_get( ) and shpm_at( ) to find the SCM space allocated before, and attaching it to the same start address;
  Checking if SCM space status is 101 (normal shutdown), and if not starting the space recovery process, otherwise continuing the following steps.
  Setting SCM space status=100 (SCM space is ready for use); and
  Scanning the Slab Class Table and the corresponding data pages used by slab classes, then creating slab classes metadata in DRAM.

According to an embodiment of the invention, a space recovery process in the space management system 100 comprises:
  Reading the SCM space status in SCM metadata;
  If SCM space status<100, restarting FT space initialization process;
  If SCM space status=100, executing the following recovery process, comprising:
    Step 1: Scan the chunk table, find those entries with chunk status<=010, or 100<=chunk status<=101:
      For each chunk with chunk status<=010 (initialization is not finished), invoke chunk management module to free this chunk (free pages and clean chunk metadata);
      For each chunk with 100<=chunk status<=101 (start to delete this chunk), invoking chunk management module 103 to re-create this chunk (allocate pages and set up chunk metadata);
    Step 2: Scanning the slab class table to find those entries with slab class stats=001 (start to add a page), and for each found slab class executing a process 200 in FIG. 14, according to an embodiment of the invention as described below.

Figure 14:
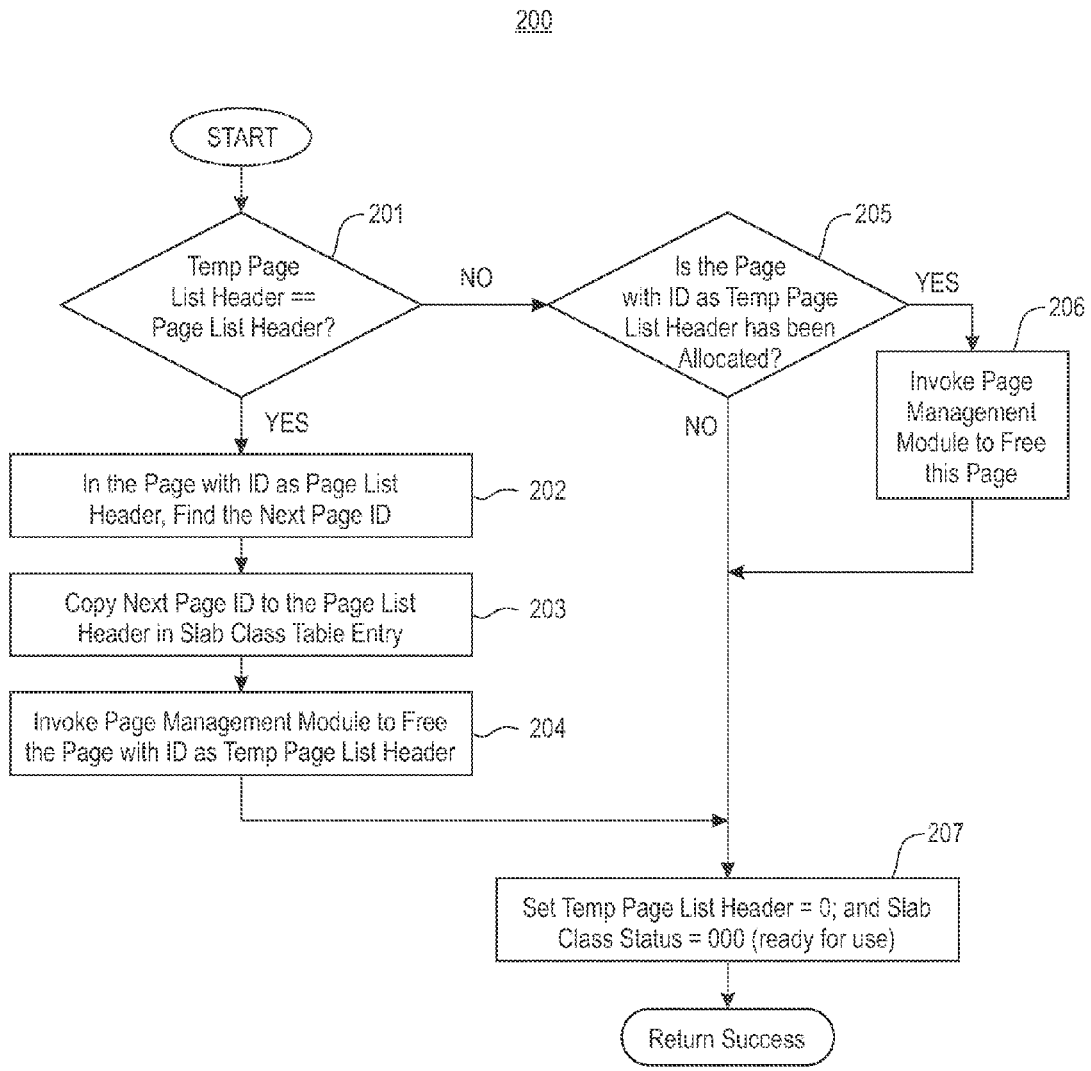
FIG. 14 is a flowchart of a storage slab management process of the space management system, according to an embodiment of the invention.

As shown in FIG. 14, process block 201 determines if temp page list header is equal to page list header. If yes, process block 202 finds the next page ID in the page with ID as page list header, process block 203 copies next page ID to the page list header in slab class table entry, and process block 204 invokes page management module 104 to free the page with ID as temp page list header, then proceeds to process block 207.

Otherwise, process block 205 determines if the page with ID as temp page list header has been allocated. If yes, process block 206 invokes page management module 104 to free this page, and then proceeds to block 207. Otherwise, the process proceeds directly to block 207. Process block 207 sets temp page list header=0, and sets slab class status=000 (ready for use).

According to an embodiment of the invention, a shutdown process in the space management system 100 comprises:
  Updating all the space management metadata changes in DRAM to the SCM;
  Setting SCM space status=101 (normal shutdown); and
  Invoking O/S system calls including int shpm_dt( ) to detach the SCM space from the application address space.

Accordingly, embodiments of the invention provide non-volatile information storage space management, including recovery and SCM lifetime protection. Because SCM does not have as good an access speed as current main memories, embodiments of the invention improve performance in conjunction with SCM space management. Embodiments of the invention provide efficient allocation and deallocation (i.e., allocation and release) processes for SCM based both on performance and SCM protection, together with a recovery mechanism in case of system crashes. Further, embodiments of the invention cache metadata into a DRAM buffer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of information storage in an information technology environment, the method comprising:
   storing data in a storage class memory (SCM) space including a partition for an SCM header area including a slab class table comprising information describing metadata for a slab class, and a partition for an SCM data area for storing the data;
   storing storage management metadata corresponding to the data, in the SCM header area of the SCM space in a first data structure, wherein the first data structure further stores allocation information;
   buffering the storage management metadata corresponding to the data, into a second data structure in a main memory, wherein the first data structure in the SCM space for the storage management metadata has a different format than the second data structure in the main memory for the storage management metadata, and wherein the second data structure comprises at least a slab class data structure that includes:
      a list of data page identifiers in the SCM data area with slots of the same size indicating a free page list; and
      a list of same-size free slot identifiers in the SCM data area; and
   in response to a storage space allocation request:
      determining availability of a free slot in the SCM space based on the storage management metadata in the second data structure in the main memory; and
      selectively allocating a slot in the SCM space for the request based on the availability of a free slot in the SCM space.

2. The method of claim 1, wherein the main memory comprises random access memory, and the data is stored in the SCM data area of the SCM space without any of the data being stored in the second data structure of the main memory.

3. The method of claim 2, wherein:
   the SCM data area is partitioned for storing the data;
   the SCM header area is partitioned for storing the storage management metadata; and
   the information describing metadata for a slab class comprises slab class unique identification (ID), slab class size and slab class status information.

4. The method of claim 3, wherein:
   the SCM data area comprises fixed-size data pages, and each data page includes fixed-size slots.

5. The method of claim 4, wherein the storage management metadata comprises:
   a page map data structure maintained in the SCM header area, wherein the page map indicates if a data page is occupied; and
   a slot map data structure maintained in the SCM header area, wherein the slot map indicates if a slot in a data page is occupied.

6. The method of claim 5, wherein:
   determining availability of a free slot in the SCM space based on the storage management metadata in the second data structure in the main memory comprises:
      accessing the main memory and searching a free slot list of a slab class therein for a free slot; and
   selectively allocating a slot in the SCM space for the request based on the availability of a free slot in the SCM space comprises:
      if a free slot is not found, allocating a slot in a last data page in the SCM data area, wherein the identifier of the data page is the last one in the free page list of the same slab class.

7. The method of claim 6, further comprising:
   in response to a data item read request, directly reading a slot in a data page containing the data item from the SCM data area, without reading the entire data page from the SCM data area.

8. The method of claim 7, further comprising:
   in response to a data item write request, locating a slot in the SCM data area via a storage space allocation request, and updating corresponding metadata in the main memory;
   writing the data item to the located slot in the SCM data area; and
   selectively updating the corresponding metadata in the SCM header area.

9. A computer program product comprising a non-transitory storage medium readable by a processor and storing instructions for execution by the processor for performing a method comprising a computer-readable hardware storage device having program code embodied therewith, the program code being executable by a computer to implement a method comprising:

storing data in a storage class memory (SCM) space including a partition for an SCM header area including a slab class table comprising information describing metadata for a slab class, and a partition for an SCM data area for storing the data;

storing storage management metadata corresponding to the data, in the SCM header area of the SCM space in a first data structure, wherein the first data structure further stores allocation information;

buffering the storage management metadata corresponding to the data, into a second data structure in a main memory, wherein the first data structure in the SCM space for the storage management metadata has a different format than the second data structure in the main memory for the storage management metadata, and wherein the second data structure comprises at least a slab class data structure that includes:

a list of data page identifiers in the SCM data area with slots of the same size indicating a free page list; and a list of same-size free slot identifiers in the SCM data area; and in response to a storage space allocation request:

determining availability of a free slot in the SCM space based on the storage management metadata in the second data structure in the main memory; and selectively allocating a slot in the SCM space for the request based on the availability of a free slot in the SCM space.

10. The computer program product of claim 9, wherein:
the main memory comprises random access memory; the SCM data area is partitioned for storing the data;
the SCM header area is partitioned for storing the storage management metadata;
the SCM data area comprises fixed-size data pages, and each data page includes fixed-size slots; and
the information describing metadata for a slab class comprises slab class unique identification (ID), slab class size and slab class status information.

11. The computer program product of claim 10, wherein:
the storage management metadata is stored in the first data structure and the second data structure;
a page map data structure is maintained in the SCM header area, and the page map indicates if a data page is occupied; and
a slot map data structure is maintained in the SCM header area, wherein the slot map indicates if a slot in a data page is occupied.

12. The computer program product of claim 11, wherein:
determining availability of a free slot in the SCM space based on the storage management metadata in the second data structure in the main memory comprises:
accessing the main memory and searching a free slot list of a slab class therein for a free slot; and
selectively allocating a slot in the SCM space for the request based on the availability of a free slot in the SCM space comprises:
if a free slot is not found, allocating a slot in a last data page in the SCM data area, wherein the identifier of the data page is the last one in the free page list of the same slab class.

13. The computer program product of claim 12, the method further comprising:

in response to a data item read request:
directly reading a slot in a data page containing the data item from the SCM data area, without reading the entire data page from the SCM data area; and
in response to a data item write request:
locating a slot in the SCM data area via a storage space allocation request, and updating corresponding metadata in the main memory;
writing the data item to the located slot in the SCM data area; and
selectively updating the corresponding metadata in the SCM header area.

14. A system for information storage in an information technology environment, comprising:
a processor;
a storage class memory (SCM) manager that uses the processor to store data in a SCM space including a partition for an SCM header area including a slab class table comprising information describing metadata for a slab class, and a partition for an SCM data area for storing the data;
a metadata manager that stores storage management metadata corresponding to the data, in the SCM header area of the SCM space in a first data structure, wherein the first data structure further stores allocation information;
a buffer manager that buffers the storage management metadata corresponding to the data, into a second data structure in a main memory, wherein the first data structure in the SCM space for the storage management metadata has a different format than the second data structure in the main memory for the storage management metadata, and wherein the second data structure comprises at least a slab class data structure that includes:
a list of data page identifiers in the SCM data area with slots of the same size indicating a free page list; and
a list of same-size free slot identifiers in the SCM data area; and
an allocation manager that in response to a storage space allocation request:
determines availability of a free slot in the SCM space based on the storage management metadata in the second data structure in the main memory; and
selectively allocates a slot in the SCM space for the request based on the availability of a free slot in the SCM space.

15. The system of claim 14, wherein:
the main memory comprises random access memory; the SCM data area is partitioned for storing the data;
the SCM header area is partitioned for storing the storage management metadata; and
the information describing metadata for a slab class comprises slab class unique identification (ID), slab class size and slab class status information.

16. The system of claim 15, wherein:
the SCM data area comprises fixed-size data pages, and each data page includes fixed-size slots;
the storage management metadata comprises:
a page map data structure maintained in the SCM header area, wherein the page map indicates if a data page is occupied; and
a slot map data structure maintained in the SCM header area, wherein the slot map indicates if a slot in a data page is occupied.

17. The system of claim 16, wherein:
the allocation manager determines availability of a free slot in the SCM space based on the storage management metadata in the second data structure in the main memory by accessing the main memory and searching a free slot list of a slab class therein for a free slot;

the allocation manager selectively allocates a slot in the SCM space for the request based on the availability of a free slot in the SCM space by, if a free slot is not found, allocating a slot in a last data page in the SCM data area, wherein the identifier of the data page is the last one in the free page list of the same slab class; and the system further comprising:
- a read manager that in response to a data item read request:
  directly reads a slot in a data page containing the data item from the SCM data area, without reading the entire data page from the SCM data area; and
- a write manager that in response to a data item write request:
  locates a slot in the SCM data area via a storage space allocation request, and updating corresponding metadata in the main memory;
  writes the data item to the located slot in the SCM data area; and
  selectively updates the corresponding metadata in the SCM header area.

* * * * *